July 21, 1942.    E. B. THOMPSON    2,290,507
WIPER AND POLISHER FOR HYDRAULIC HOIST PISTON RODS
Filed April 7, 1941
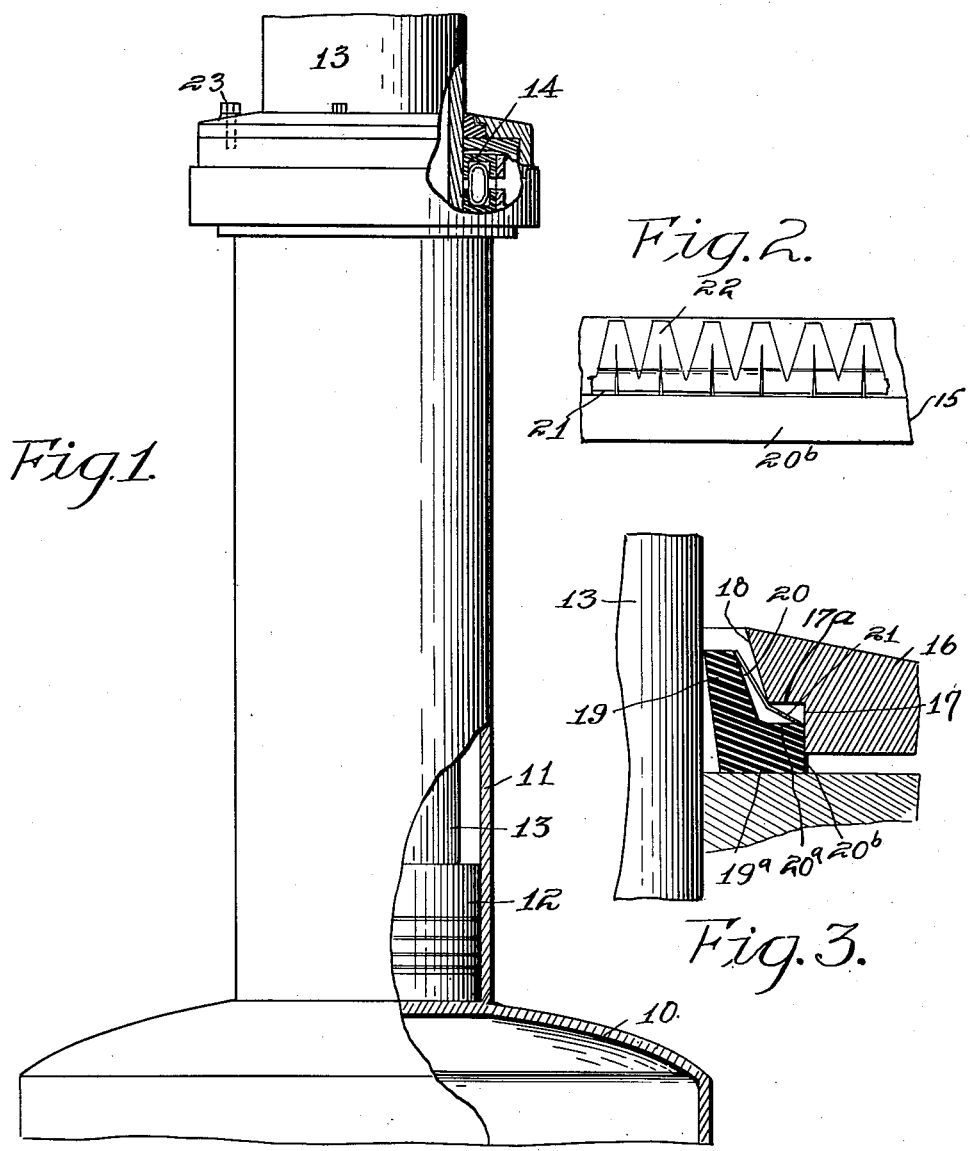

Patented July 21, 1942

2,290,507

UNITED STATES PATENT OFFICE 2,290,507

WIPER AND POLISHER FOR HYDRAULIC HOIST PISTON RODS

Elmer B. Thompson, Des Moines, Iowa, assignor to Globe Hoist Company, Des Moines, Iowa, a corporation of Iowa Application April 7, 1941, Serial No. 387,269

1 Claim. (Cl. 286—18)

My invention is especially advantageous in the art of hydraulic automobile hoists.

Said hoists have upright cylinders and piston rods therein, and the automobile supporting rails are at the upper end of the piston rod. When they are used for washing the under surfaces of an automobile, large quantities of mud, sand, etc., flow down the piston rod, and when ordinary packing is used at the point where the piston enters the cylinder, some of this gritty matter will adhere to the piston rod and be carried past the packing into the cylinder, with the result that it will wear and score the piston rod and ruin the lubricating function of the oil within the cylinder.

The object of my invention is to provide a supplemental packing secured to the cylinder above the usual oil-retaining packing, to perform the function of a wiper which, during the down stroke of the piston rod, will thoroughly remove all foreign matter on the piston rod and deliver it to a point beyond the piston rod, so that as the cleaned portion enters the usual oil-retaining packing in the cylinder, it will be cleanly polished and will not deliver any gritty substance to the piston within the cylinder.

A further object is to provide a wiper of this class which is of long life, which will function efficiently for many years without any attention by the operator.

In the accompanying drawing:

Figure 1 shows a side elevation, partly in section, of an automobile hoist upright hydraulic cylinder, a piston and piston rod, an oil-retaining packing near the top of the cylinder and my improved wiper packing at the top of the cylinder;

Figure 2 shows a detail side view of a portion of the flexible wiper ring and the spring for forcing it toward the piston rod; and Figure 3 shows a detail vertical sectional view through the wiper and polisher.

The hydraulic automobile hoists now in common use comprise an oil tank 10, an upright cylinder 11 secured thereto, a piston 12 within the cylinder, a piston rod 13 in the form of a hollow cylinder of large diameter, and a packing 14 at the upper portion of the cylinder to retain the oil within the cylinder. This hoist is usually embedded in concrete.

When in use for car washing or repair purposes the piston extends far enough above the floor surface for the operator to stand upright under the car being serviced, hence, a very large surface of the piston rod is exposed, and dust, mud, sand and the like are deposited upon its surface.

For the purpose of fully and completely removing such foreign matter from the piston during its downward movement, and also providing a piston polishing function I have formed at the top of the cylinder a shoulder 15 having a horizontal upper surface adjacent the piston rod. Above this shoulder is an annular plate 16 having at its inner edge a vertical shoulder at 17 and a horizontal portion 17a, and above it a shoulder 18 inclined upwardly and toward the piston.

The wiper element, indicated generally by the reference numeral 19, is made of a flexible material, such as rubber. Its lower surface is flat and rests upon the surface 15. It is of annular form and its inner surface is inclined downwardly and outwardly. It has a wide base at 19a to engage the shoulder 17, and its upper outer portion is tapered inwardly at 20 toward the piston, hence, its upper portion is relatively thin and may be yieldingly pressed against the piston rod. Below the part 20 is a horizontal portion 20a, and below that is a vertical portion 20b.

It is well known that packing rings made of rubber or like substances will, after a short period of use, become "set," that is to say, they will assume a fixed position and will not function to contract or expand, but are still flexible.

For the purpose of causing the upper portion of the wiper to be yieldingly held against the piston rod after the wiper ring has become set I have provided a resilient metal collar comprising an annular base portion 21 shaped to fit against the top surface of the wiper base 19a, and a series of tapered fingers 22 extended upwardly and toward the piston to engage the upper outer surface of the wiper member. This collar normally is shaped so that when placed in position on the wiper member its central portion will stand spaced from the wiper and its upper and lower edges will engage the wiper so when pressed down and held by the collar 16 the upper ends of said fingers 22 will apply yielding pressure to the upper edge of the wiper, tending to press it against the piston. The collar is secured to the cylinder by set screws 23 and by adjustment of these set screws the amount of pressure applied to the upper portion of the wiper ring may be regulated to suit the requirements.

In Fig. 3 of the drawing the parts are shown in the position they assume before the collar 16 is forced down. When the collar is forced down by adjustment of the set screws, the metal spring is pressed into shape substantially conforming to the adjacent edge of the collar 16, as shown in Fig. 1.

In practice, it is highly desirable that the outer surface of the piston rod be smooth, and in their manufacture great care is used to make such surface as smooth as commercially practicable. I have demonstrated by actual use of a large number of my improved wipers that after a period of use, the wiper not only effectively removes all foreign matter from the surface of the piston rod, so that the oil within the cylinder is not injured thereby, but also that the surface of the piston rod engaged by the wiper attains a higher polish than that originally applied. This result is attained by having the piston rod reciprocate through the wiper, thereby removing foreign matter on its down stroke and effecting a polishing operation on its up stroke as well as on the down stroke.

I claim as my invention:

A wiper and polisher for hydraulic hoist piston rods, comprising a flexible wiper ring having a wide base portion and its upper portion tapered to a relatively narrow top portion and having an outwardly extended shoulder near its central portion, a base to support the wiper ring, a collar surrounding the wiper ring and having an upwardly extending portion to engage the lower outer surface of the wiper ring, an inwardly extended portion to project over the said shoulder of the wiper ring and an upwardly and inwardly tapered portion adjacent the upper edge of the wiper ring, an annular spring between said wiper ring and collar having its upper edge engaging the outer surface of the top portion of the wiper ring and extended downwardly and outwardly and having its lower edge resting upon said shoulder of the wiper ring, its central portion being normally spaced apart from the wiper ring and tending to spring outwardly, and means for vertically adjusting the collar whereby its inner central portion will engage the central portion of the annular spring to thereby apply varied pressures to the top portion of the wiper ring.

ELMER B. THOMPSON.